United States Patent Office 2,920,942
Patented Jan. 12, 1960

2,920,942
PURIFICATION OF BCl₃ WITH ALUMINUM CHLORIDE

Lars C. Bratt, Mountain View, Amos J. Leffler, Lafayette, and George A. Louis, Berkeley, Calif.

No Drawing. Application May 17, 1957
Serial No. 659,757

2 Claims. (Cl. 23—205)

This invention relates to the purification of boron trichloride and tribromide and, more specifically, relates to the purification of boron trihalides to remove phosgene therefrom. In the manufacture of boron trichloride and boron tribromide, phosgene is frequently produced and, since phosgene interferes with the ultimate use of the boron trihalide, it is highly desirable to remove the phosgene. Due to the similar boiling points and closely related volatilities, the separation of phosgene from boron trichloride by distillation is not economically feasible. The proposed process offers a cheap and convenient means for the quantitative removal of phosgene from boron trichloride.

In accordance with the present invention, a method is provided for the purification of boron trihalides wherein it is not necessary to condense the boron trihalide as it is produced and subject it to a separate operation; the process of the present invention enables one to remove phosgene continuously from the boron trihalide as it is produced, without any intermediate step. However, the invention is applicable at other stages of the process so that if one has a boron trihalide which is contaminated with phosgene, the boron trihalide may be volatilized and the phosgene removed therefrom by practicing the present invention.

The invention makes use of a Friedel-Crafts reaction whereby benzene or derivatives such as toluene are reacted with the phosgene in the boron trichloride in the presence of anhydrous aluminum chloride as a catalyst, to form benzophenone or similar compounds. On a technical scale this process is carried out as follows:

Benzene (or toluene) is kept at boiling temperature in a steam jacketed kettle equipped with a reflux tower. Powdered anhydrous aluminum chloride is kept suspended in the boiling liquid. The reflux tower is either filled with an inert ceramic filling or if desired with granular anhydrous aluminum chloride. Vaporized crude boron trichloride is bubbled continuously through the boiling benzene, where the phosgene in the crude BCl₃ reacts almost instantaneously with the benzene. Final traces of phosgene may be removed in a reflux tower filled with anhydrous AlCl₃ granules. Pure BCl₃ is withdrawn continuously from the top of the reflux column. Traces of chlorine in the crude BCl₃ are also removed by this method.

The following non-limiting examples illustrate methods of practicing the present invention:

Example I

About 10 grams of aluminum chloride powder in 250 cc. of benzene was placed in a 3-necked flask fitted with a packed column and condenser for refluxing the benzene and an inlet for bubbling crude BCl₃ under the surface of the liquid. A heating mantle was used to bring the contents to a heavy boilup rate. Approximately 40 grams of phosgene-contaminated BCl₃ was distilled through the benzene and refluxing column and collected in a chilled receiver. Analysis by the infrared spectrophotometer showed the phosgene content before and after treatment to be 1.0% and 0.05% respectively.

Example II

The process of Example I was repeated except that granular instead of powered aluminum chloride was used in the reboiler and was also included in the column packing (mixed with glass Raschig rings). Phosgene analyses before and after were 1.0% and nil respectively.

We claim:

1. The process for purifying a compound selected from the group consisting of boron tribromide and boron trichloride containing a small amount of phosgene as an impurity comprising: refluxing an aromatic hydrocarbon selected from the group consisting of benzene and toluene, said hydrocarbon having aluminum chloride suspended therein and passing said impure boron trihalide in vaporous form continuously through said refluxing aromatic hydrocarbon whereby to remove said phosgene from said boron trihalide and recovering said boron trihalide.

2. The process of claim 1 wherein said recovered boron trihalide is thereafter passed through anhydrous aluminum trichloride granules whereby to remove the last traces of phosgene impurity.

References Cited in the file of this patent

UNITED STATES PATENTS 2,369,214     Cooper _____ Feb. 13, 1945

OTHER REFERENCES

Karrer: "Organic Chemistry" (1946), page 494.
Mellor: "Treatise on Inorg. and Theor. Chemistry" (1924), vol. 5, pages 130 and 134.

UNITED STATES PATENT OFFICE

CERTIFICATE OF CORRECTION

Patent No. 2,920,942                                    January 12, 1960

Lars C. Bratt et al.

It is hereby certified that error appears in the above numbered patent requiring correction and that the said Letters Patent should read as corrected below.

In the grant, lines 1 and 2, for "Lars C. Bratt, of Mountain View, Amos J. Leffler, of Lafayette, and George A. Louis, of Berkeley, California," read -- Lars C. Bratt, of Mountain View, Amos J. Leffler, of Lafayette, and George A. Louis, of Berkeley, California, assignors to Stauffer Chemical Company, a corporation of Delaware, --; lines 11 and 12, for Lars C. Bratt, Amos J. Leffler, and George A. Louis, their heirs" read -- Stauffer Chemical Company, its successors --; in the heading to the printed specification, lines 4 and 5, for "Lars C. Bratt, Mountain View, Amos J. Leffler, Lafayette, and George A. Louis, Berkeley, Calif." read -- Lars C. Bratt, Mountain View, Amos J. Leffler, Lafayette, and George A. Louis, Berkeley, Calif., assignors to Stauffer Chemical Company, a corporation of Delaware --.

Signed and sealed this 14th day of June 1960.

(SEAL)
Attest:
KARL H. AXLINE
Attesting Officer

ROBERT C. WATSON
                                                                  Commissioner of Patents